US005652034A

United States Patent [19]
Seiner

[11] Patent Number: 5,652,034
[45] Date of Patent: Jul. 29, 1997

[54] BARRIER PROPERTIES FOR POLYMERIC CONTAINERS

[75] Inventor: Jerome A. Seiner, Pittsburgh, Pa.

[73] Assignee: PPG Industries, Inc., Pittsburgh, Pa.

[21] Appl. No.: 767,599

[22] Filed: Sep. 30, 1991

[51] Int. Cl.$^6$ .................................................. B29D 22/00
[52] U.S. Cl. .................. 428/36.6; 428/36.7; 220/415; 220/457; 427/256
[58] Field of Search .................. 428/36.6, 36.7, 428/212, 220, 451, 474.7, 475.2, 483, 195; 220/415, 417, 454, 457, 458; 427/256, 41, 430.1; 215/1 C

[56] References Cited

U.S. PATENT DOCUMENTS

| | | | |
|---|---|---|---|
| 3,757,983 | 9/1973 | McCarthy | 220/415 |
| 4,284,671 | 8/1981 | Cancio et al. | 428/36.6 |
| 4,478,874 | 10/1984 | Hahn | 427/40 |
| 4,515,836 | 5/1985 | Cobbs, Jr. et al. | 427/425 |
| 4,525,377 | 6/1985 | Nickel et al. | 427/12 |
| 4,534,995 | 8/1985 | Pocock et al. | 427/38 |
| 4,550,043 | 10/1985 | Beck | 428/36 |
| 4,552,791 | 11/1985 | Hahn | 428/702 |
| 5,006,381 | 4/1991 | Nugent, Jr. et al. | 428/36.6 |
| 5,008,137 | 4/1991 | Nugent, Jr. et al. | 428/36.6 |

FOREIGN PATENT DOCUMENTS

| | | |
|---|---|---|
| 720 098 | 2/1969 | Belgium . |
| 327 039 | 8/1989 | European Pat. Off. . |
| 2 090 219 | 7/1982 | United Kingdom . |
| 2 205 295 | 12/1988 | United Kingdom . |

OTHER PUBLICATIONS

The American Chemical Society, STN International®, Jan. 9, 1986, CA file search results, p. 11.

*Primary Examiner*—Charles Nold
*Attorney, Agent, or Firm*—Dennis G. Millman

[57] ABSTRACT

The shelf life of polymeric containers may be economically extended by coating with a barrier material having less than half the permeability of the substrate polymer, the coating being applied to 30 to 75 percent of the container's area, with the proviso that the uncoated area has an average permeability of no more than 15 cc-mm per square meter per day per atmosphere.

11 Claims, No Drawings

BARRIER PROPERTIES FOR POLYMERIC CONTAINERS

The present invention relates to both a method for improving the gas barrier properties of polymeric containers and to the improved container itself. More particularly, the invention involves a technique for applying selected barrier coatings to selected polymeric containers to effectively and economically reduce the permeation of gases into or out of the containers.

BACKGROUND OF THE INVENTION

Plastics have found ever increasing use as replacements for glass and metal containers in packaging, especially of foods and beverages. The advantages of such plastic packaging includes lighter weight, decreased breakage versus glass and potentially lower costs. However, the gas-barrier properties of even reasonably good barrier plastics such as polyethylene terephthalate and polyvinylchloride are inadequate for many purposes. This inadequacy is particularly acute with small containers of ½ liter or less in volume where the surface to volume ratio is relatively high, such that many food products do not have an acceptable shelf life. Thus, the most widespread use of polymeric containers has been in the 1 to 2 liter size, but even with these larger sizes shelf life is limited, and there is considerable value in reducing the permeability of such containers. Permeation of gases through the walls leads to product degradation in the form of decarbonation (carbon dioxide loss) from carbonated drinks and to oxygen ingress and taste change in beers and other food products.

Barrier coatings have been applied onto plastic containers in order to reduce their permeability. Not surprisingly, it has heretofore been thought necessary to maximize the area of the container that is coated with these barrier materials in order to achieve satisfactory results. U.S. Pat. No. 4,515,863 (Cobbs et al.) discloses the coating of an entire polyethylene terephthalate (PET) bottle uniformly with polyvinylidene chloride (PVDC). U.S. Pat. Nos. 4,534,995 (Pocock et al.), 4,525,377 (Nickel et al.) and Japanese Kokai 60-2361 (Kuraray Co., Ltd.) all disclose pre-coating PET parison preforms with PVDC or with ethylenevinylalcohol (EVAL) barrier materials prior to blow molding bottles. In every case these parisons are coated right up to the neck thread area, whereby the final blow molded bottle has virtually its entire external surface coated. U.S. Pat. No. 4,478,874 (Hahn) discloses vapor deposition of inorganic oxide barrier coating to the entire external surface of PET containers and bottles.

Polymeric containers are low cost products and therefore are very sensitive to the costs of manufacture. As a result, the industry is constrained from using barrier coatings at substantial thicknesses to achieve major reductions in permeability. Furthermore, blow molded polymeric containers usually have wall portions in which the plastic is of non-uniform thickness, such that some wall portions allow less permeation than other portions. Thus, uniformly applied barrier coatings may be wastefully applied to thick areas that already have relatively low permeability. It has also been discovered that applying some barrier coatings to entire container tends to exacerbate stress cracking problems in small radius areas in the base portion of some container shapes.

It would be desirable to make more economical and effective use of barrier coatings for polymeric containers while avoiding detrimental side effects.

SUMMARY OF THE INVENTION

The present invention circumvents the inadequacies described above. It has been found that when gas barrier coatings of exceptionally low permeability are used, the reduction in gas transport through coated areas is sufficient that substantial portions of a polymeric container may remain uncoated, provided that the permeability of the substrate polymer of the container is within certain limits. More specifically, with a substrate polymer having a permeability of less than 15 cubic centimeters-millimeter per square meter per day per atmosphere, and a barrier coating having less than half that of the substrate, shelf life of a product sealed in the container can be expected to be approximately doubled with only 30 to 75 percent of the surface area of the container coated with the barrier coating.

The areas of a polymeric container that are left uncoated in the present invention may be the most troublesome areas, such as complex shaped areas that are difficult to coat uniformly, or sharply curved areas that are prone to stress cracking when coated. Therefore, with the present invention the coating process may be simplified by applying the barrier coating only onto areas of the container that are relatively easy to coat, such as the vertical side wall portions. As a result, the need for complex combinations of spray nozzles is avoided. The barrier material may also be limited to areas on the container that are to be covered by a label or other opaque material, thereby reducing the transparency requirements for the barrier coating. Alternatively, the barrier coating may be applied specifically to areas on the container that are known to be more permeable than others, such as thin walled areas resulting from the particular shape of the container, or areas in which the polymeric material of the container is less oriented (and thus more permeable) due to uneven stretching during the forming operation.

Not only are economies attained in the process of applying the barrier coating, but also the amount of coating material is reduced, resulting in further savings. Instead of extending shelf life, the present invention can be employed to reduce the weight of the container while approximately maintaining shelf life. By reducing the amount of polymer used in each container, savings result that can at least partially offset the cost of the barrier coating material, particularly since substantially reduced amounts of barrier coating are required.

In view of the meticulous care taken in most barrier coating operations to insure complete coverage, deliberately coating only a portion of polymeric containers is a significant departure from the prior art.

DETAILED DESCRIPTION

By reasonably good substrate polymers is meant those having gas permeability rates for the selected gas of less than 15.0 cc-mm per square meter per day per atmosphere. Several examples include: polyethylene terephthalate (PET) whose permeation values for oxygen and carbon dioxide are 2.2 and 4.7 respectively; polyvinylchloride (PVC) whose values are 2.8 and 5.9; polyamide whose values are 2.3 and 4.7; and polyacrylonitrile (PAN) whose values are 0.44 and 1.2. Unoriented PVC has a carbon dioxide permeability of 12.0. Good transparent barrier coatings have a permeability of less than 1.5 and preferably less than 0.5. Several specific examples are polyvinylidene chloride (PVDC) with values of 0.04 and 0.12 for oxygen and carbon dioxide respectively, ethylenevinylalcohol (EVAL) with values of 0.05 and 0.12 and polyamine polyepoxide containing at least 7% nitrogen with values of 0.19 and 0.10.

The effect of the present invention can be demonstrated by the following calculations. An uncoated half liter PET bottle having a surface area of approximately 60 square inches and an average wall thickness of 12 mils would typically have a shelf life of about eight weeks for a carbonated beverage. Shelf life is generally considered to be the time that a carbonated beverage loses 15 percent of its carbonation. Assuming that the PET has an average carbon dioxide permeability of 18 cc-mil/100 square inches/day/ atmosphere, it can be calculated that the bottle described above would lose approximately 200 cubic centimeters of carbon dioxide in the eight week period. This may be compared to the same PET bottle with 70 percent of its area coated with the polyamine-polyepoxide coating of Example 2 below at a thickness of 0.5 mil. It can be calculated that the carbon dioxide loss from the partially coated bottle in the same eight week period is about 70 cubic centimeters. As a result, the partially coated bottle could be expected to have a shelf life on the order of at least twice that of the uncoated bottle.

The specific percentage of the area of the container one chooses to coat (e.g., in the range of about 30 to 75 percent) with a barrier coating will depend upon its ultimate usage and producer and customer requirements. The permeability of the barrier coating and its thickness are additional variables that are taken into account. The above example is just one of many variations that are workable. For a 2 liter PET bottle it is estimated that the shelf life of a carbonated soft drink can be extended from 13 to 30 weeks by coating only 35 percent of its exterior surface with the preferred barrier compositions. For a 2 liter PET beer bottle, on the other hand, it is projected that it would be necessary to coat 70 to 75 percent of its exterior surface to both retain carbonation and to reduce oxygen ingress sufficiently.

The following examples demonstrate a preferred type of barrier coating composition that comprises a reaction product of a polyamine and a polyepoxide. This composition is the subject matter of a copending U.S. patent application Ser. No. 07/767,458 filed on even date herewith by K. W. Niederst, R. M. Nugent, Jr., and J. A. Seiner, the disclosure of which is hereby incorporated by reference.

EXAMPLE 1

An adduct was made by reacting 7 moles of tetraethylene pentamine with 6 moles of EPON 828 polyepoxide in 1-methoxy-2-propanol (Dowanol PM). At 33.5 percent total solids, 230.92 grams of this adduct was mixed with 21.0 grams of diethanolamine. To this mixture was added 36.10 grams of TETRAD X (N,N,N',N' tetrakis (oxiranylmethyl-1,3-benzene dimethanamine, available from Mitsubishi Gas Chemical Co.), 108.75 grams of additional Dowanol PM, and 111.18 grams of 2-butoxyethanol (butyl Cellosolve). This composition was 25.0 percent total solids, had a theoretical amine nitrogen content of 11 weight percent of the solid reaction product, and had a theoretical hydroxyl content of 12.9 weight percent. The solvent ratio was 65/35 on a weight basis Dowanol PM/butyl Cellosolve. The composition was applied to 1 mil polypropylene film and baked 15 minutes at 140° F. The film was glossy and hard, and when tested after several days aging at room temperature exhibited oxygen permeability of 0.6 cc-mil/100 in²-day-atmosphere at 30° C., dry conditions, and exhibited carbon dioxide permeability of 0.2 cc-mil/100 in²-day-atmosphere at 30° C., dry conditions.

EXAMPLE 2

This example is the same as Example 1, except that at the point when the TETRAD X was added to the mixture, 6.72 grams of deionized water was also added. The resulting oxygen permeability of the film was 0.31 cc-mil/100 in²-day-atmosphere at 30° C., dry conditions, and the carbon dioxide permeability was 0.03 cc-mil/100 in²-day-atmosphere at 30° C., dry conditions.

Another type of barrier coating that may be used with the present invention are coatings of metal oxides such as silicon oxide as disclosed in U.S. Pat. No. 4,478,874, the disclosure of which is incorporated by reference. Such coatings may be applied to a polymeric substrate in a vacuum chamber where a silicon monoxide source is vaporized and ionized into a plasma by an RF energy source, and the plasma is caused by an electric field to impinge onto the substrate with sufficient energy to imbed SiO ions into the surface of the substrate. The container being coated may be rotated during deposition if desired. Because of the complexity of applying this type of barrier coating, they are not as desirable as the polyamine-polyepoxide type of coatings.

Yet another type of barrier coating that may meet the permeability requirements of the present invention, although inferior to the polyamine-polyepoxy coatings in other respects, are the polyvinylidene chloride coatings of the type disclosed in U.S. Pat. No. 4,515,836, the disclosure of which is incorporated by reference.

Although the present invention has been described with reference to specific details, it is not intended that such details should be regarded a limitations upon the scope of the invention, except as to the extent they are included in the accompanying claims.

I claim:

1. A polymeric container coated on 30 to 75 percent of its exterior surface with a barrier material whose gas permeability is less than half that of the polymer of which the container is made, the remaining area of the polymeric container without the barrier material having an average carbon dioxide permeability of less than $$15 \frac{(\text{centimeter})^3 \cdot \text{millimeter}}{(\text{meter})^2 \cdot \text{day} \cdot \text{atmosphere}}$$

the base portion of the container being substantially excluded from the area that is coated with the barrier material.

2. The container of claim 1 where the gas permeability of the barrier material is less than 0.2 cc mm per square meter per day per atmosphere.

3. The container of claim 1 where 30 to 60% of the exterior surface is coated with the barrier material.

4. The container of claim 1 wherein 30 to 50% of the exterior surface is coated.

5. The container of claim 1 wherein the polymer is selected from those materials whose major portion consists of polyester, polyvinylhalide, polyamide or polyacrylonitrile.

6. The container of claim 5 wherein the polyester is polyethylene terephthalate or polybutylene terephthalate or a mixture thereof.

7. The container of claim 5 wherein the polyvinylhalide is polyvinylchloride.

8. The container of claim 1 where the barrier material is a transparent coating.

9. The container of claim 5 wherein a major portion of the barrier material is selected from the group consisting of polyvinylidenechloride and a polyamine-polyepoxide which contains at least 7% nitrogen.

10. The container of claim 5 wherein a major portion of the barrier material is silicon oxide.

11. The container of claim 1 wherein the polymeric container is a bottle.

* * * * *